United States Patent [19]

Heibel

[11] Patent Number: 4,775,033
[45] Date of Patent: Oct. 4, 1988

[54] FLOATING CALIPER SPOT-TYPE DISC BRAKE

[75] Inventor: Helmut Heibel, Moschheim, Fed. Rep. of Germany

[73] Assignee: Lucas Industries public limited company, Birmingham, England

[21] Appl. No.: 1,450

[22] Filed: Jan. 8, 1987

[30] Foreign Application Priority Data

Jan. 17, 1986 [DE] Fed. Rep. of Germany ... 8601094[U]
Apr. 30, 1986 [DE] Fed. Rep. of Germany ... 8611885[U]

[51] Int. Cl.$^4$ ............................................. F16D 65/12
[52] U.S. Cl. .................... 188/73.43; 188/71.1; 188/73.31; 188/73.37; 188/73.44; 188/370
[58] Field of Search ................ 188/71.1, 73.43, 73.31, 188/73.42, 73.44, 73.45, 72.4, 72.5, 370, 73.47, 73.37

[56] References Cited

U.S. PATENT DOCUMENTS

| | | | |
|---|---|---|---|
| 3,166,159 | 1/1965 | Burnett | 188/73.42 |
| 3,402,790 | 9/1968 | Rath | 188/72.5 |
| 3,768,604 | 10/1973 | Falk | 188/73.43 |
| 3,924,711 | 12/1975 | Hoffmann et al. | 188/73.43 |
| 4,285,417 | 8/1981 | Ostwald | 188/73.43 |
| 4,321,984 | 3/1982 | Burgdorf et al. | 188/73.43 |

FOREIGN PATENT DOCUMENTS 2750337 5/1979 Fed. Rep. of Germany ... 188/73.43
1161355 8/1969 United Kingdom ............... 188/71.1

Primary Examiner—Andres Kashnikow
Assistant Examiner—Mark T. Le
Attorney, Agent, or Firm—Scrivener and Clarke

[57] ABSTRACT

A floating caliper of a spot-type disc brake supported for displacement with respect to a carrier member which is fixed to a vehicle and includes two brake pads for pressurizing the brake disc from either side. A hydraulic piston and cylinder assembly in the floating caliper directly pressurizes one of the pads and indirectly pressurizes the other pad by way of the floating caliper, with a sliding guide being provided between the carrier member and the floating caliper wherein one of the pads is supported circumferentially exclusively on the floating caliper and the other pad is exclusively supported on the piston of the piston and cylinder assembly, another sliding guide being provided on the carrier member for engagement by the piston.

15 Claims, 5 Drawing Sheets

FLOATING CALIPER SPOT-TYPE DISC BRAKE

The invention relates to a floating caliper spot-type disc brake for motor vehicles, comprising a floating caliper supported for displacement with respect to a carrier member which is fixed at the vehicle, two brake pads pressurizing the brake disc from either side and being associated at their faces remote from the brake disc with backplates for friction linings, an hydraulic piston and cylinder assembly in the floating caliper for direct pressurization of one of the two brake pads and pressurization of the other one by way of the floating caliper, and further comprising a sliding guide means between the carrier member and the floating caliper.

A floating caliper spot-type disc brake of that kind is known from DE-PS No. 28 45 404. With the known disc brake two prongs project from a carrier member which is fixed at the vehicle and these prongs support the two backplates of the brake pads. A sliding guide means supports the floating caliper at the carrier member for displacement in the direction of the axis of the brake disc. The frictional force generated upon braking thus is transmitted directly to one or the other of the two prongs, depending on the travelling direction.

Usually the backplates of the friction linings and the carrier member which is fixed at the vehicle or the prongs fastened to the carrier or other guide means are made of metals which are susceptible of corrosion. A particularly great risk of corrosion exists upon contact with salty water. Once corroded, the movability of the backplates of the friction linings is impeded, in other words their free movement toward the brake disc and away from the same at the end of a braking action is obstructed. The floating caliper, on the other hand, can be supported movably in sealing fashion at the carrier member which is fixed to the vehicle so that no problems occur as far as the sliding motion of the floating caliper with respect to the carrier member is concerned.

DE-OS No. 14 25 212 discloses a disc brake with which the backplates of the friction linings are not supported at a carrier member which is fixed to the ehicle but instead at a movable housing. The housing is not supported like a floating caliper but instead pivots about two axes during braking movement. Consequently this is not a floating caliper disc brake. The frictional forces generated upon braking are transmitted to the stationary carrier member by way of the joints of the housing. There are no sliding guide means which tend to corrode. However, the joints are subjected to extreme stress and, therefore, must be designed to be very stable. This involves considerable manufacturing expenditure.

It is, therefore, an object of the instant invention to develop a floating caliper spot-type disc brake of the kind specified initially such that the sliding movement of the brake pads cannot be impaired, especially not by corrosion. It is another object of the instant invention to provide a brake of the kind in question which will maintain its functional integrity over a long period of time at low manufacturing costs.

These objects are met, in accordance with the invention, in that one of the backplates of the friction linings is supported circumferentially exclusively on the floating caliper and the other one exclusively on the piston of the piston and cylinder assembly, and in that another sliding guide means is provided between the piston or a structural member firmly connected to the same and the carrier member.

This means that in accordance with the invention the backplates plates of the friction linings are not supported directly at the carrier member which is fixed to the vehicle. Rather, the relative motion between the carrier member fixed to the vehicle and the backplates of the friction linings as well as the floating caliper is provided exclusively by sliding guide means which are disposed between the floating caliper and the piston of the piston and cylinder assembly, on the one hand, and the carrier member, on the other hand, and which can be protected against splashing water so that the risk of corrosion largely can be excluded.

No frictional resistance worth mentioning is opposed to the movement of the brake pads toward and away from the brake disc with the floating caliper spot-type disc brake according to the invention. Thus it is warranted that the brake torque can be eliminated entirely upon termination of a braking action because the friction linings are free to separate from the brake disc.

The frictional forces transmitted to the friction linings in circumferential direction of the brake disc may be transmitted to the carrier member which is fixed to the vehicle in symmetrical order, based on the plane of the brake disc. This increases the stability of the entire arrangement.

The only machining which the carrier member requires that is fixed at the vehicle in the case of the brake according to the invention is by way of lathe tools. It is not necessary to use expensive broaches as the friction lining shaft need not be broached.

If a high brake torque is introduced, the carrier member fixed at the vehicle flexes slightly. Yet both the floating caliper and the piston (of the piston and cylinder assembly) or the structural member firmly connected to the piston have a certain freedom to pivot with respect to the axis of the brake disc so that the floating caliper as well as the piston can compensate the minor movements of the carrier member and the friction linings will always pressurize the brake disc exactly in parallel planes.

The floating caliper spot-type disc brake preferably is designed to comprise two sliding guide means each at either side of the brake disc and spaced in circumferential direction of the same. The sliding guide means between the carrier member and the floating caliper are disposed at one side of the brake disc, while the sliding guide means between the carrier member and the piston or the structural member firmly connected to the same are arranged at the other side of the brake disc. In view of the fact that the floating caliper and the brake piston or the structural member firmly connected to the same are (slightly) pivotable about the central axis of the piston and cylinder assembly and movable along this axis, the supporting by way of four sliding guide means at the carrier member which is fixed at the vehicle kinematically presents a so-called three-point support whereby the floating caliper and the piston are statically defined under any loading.

Preferably the floating caliper and the piston are provided with rotationally symmetrical seats for protective boots as this permits the use of simple rotationally symmetrical boots. It is easy to slip on these boots.

The sliding guide means preferably are embodied by arrangements consisting of guide pins and grooves, the guide pins being fastened to the carrier member which is fixed at the vehicle and the grooves being provided in the floating caliper or in the piston or the structural member firmly connected to the same. Yet it is possible as well to mount the guide pins on the latter structural members and provide the grooves in the carrier member fixed at the vehicle. No matter what the arrangement, the sliding guide means can be sealed against splashing water by means of boots. It is preferred to cover the boots by a protective sheet at least at the sides facing the friction linings which become hot. In this manner the boots cannot heat up too much.

With disc brakes of the kind in question it is essential that the brake pads or floating caliper be guided for sliding movement without any trouble. It is especially by too much clearance of the members that undesired squeaking noises may occur when actuating the brakes.

To guarantee perfect sliding guidance of the moving members and avoid undesired squeaking, therefore, a special modification of the invention provides for the sliding guide means to be embodied by tongue and groove arrangements each at the trailing end of the brake.

As the forces generated at the rotating brake disc during normal braking are transmitted to the trailing end of the brake and then on to the carrier member which is fixed at the vehicle, the tongue and groove arrangement in accordance with the invention has the effect that the moving members, i.e. the floating caliper with one of the brake pads, on the one hand, and the piston (or the slide firmly connected to the same) together with the other brake pad are guided without clearance and closely fitting with respect to the stationary carrier member.

In a preferred modification of the invention a wedge-shaped guide pin each is fastened at the piston or a slide firmly connected to the same and at the floating caliper at the trailing end of the brake. Each such guide pin engages in a corresponding complementary groove formed in the carrier member or in an intermediate piece firmly connected to the same and made of steel, especially hardened steel.

At the leading end of the brake, preferably, no tongue and groove arrangements are provided as sliding guide means. Instead, cylindrical guide pins each are provided between the piston or the slide firmly connected to the same as well as the floating caliper and the carrier member. These guide pins are fastened at the carrier member and engage in complementary grooves in the piston or slide firmly connected to the same and in the floating caliper or an intermediate piece firmly connected to the floating caliper.

The intermediate pieces in the sliding guide means provided in accordance with a variant of the invention may be made of hardened material so as to improve the resistance to stress and prolong the service life of the brake.

In a preferred modification of the invention springs are arranged between the carrier member or the guide pins and the floating caliper as well as the piston at the leading end of the brake. These springs bias the floating caliper or the piston in the direction of the trailing end of the brake.

Thus all movable members of the brake (floating caliper, brake pads, piston, and slide) are permanently biased in the direction of the trailing end of the brake, whereby rattling and squeaking are excluded.

In a further development of the invention a per se known retaining clamp of the friction linings is of such U-shaped design that its legs deform such that at the leading end of the brake the structural members forming the sliding guide means at one side of the brake disc are biased in opposite direction to that at the other side of the brake disc.

Before firmly mounting the floating caliper spot-type disc brakes in a vehicle, there is a risk that the floating caliper will become displaced with respect to the carrier member in handling the brake. This is so particularly during shipment and assembly of the brake. To overcome this risk, it is provided in a preferred modification of the invention that at least part of the groove-like recesses are formed at their bottoms each with another groove which is narrower and axially limited and engaged by a narrow tongue formed at the corresponding guide pin. In this manner relative movements between the floating caliper and the carrier member as well as between the piston and the carrier member are limited. The narrow tongue and the further axially limited groove do not present the support which is provided exclusively by the guide pins and the groove-like recesses themselves.

It is known, that uneven wear of the friction linings may occur in floating caliper spot-type disc brakes, caused by torques about the axis of the brake. Such oblique wear of the friction linings is described in detail in DE-PS No. 12 38 284. The supporting of the backplates of the friction linings described above in accordance with the invention has the advantage that the lever arms determining the uneven wear of the friction linings are independent on the instantaneous condition of wear of the lining, i.e. the lever arms are constant throughout the entire wear of the friction lining of the brake. Exploiting this advantage, the invention indicates the amount by which the axes of the backplates must be offset with respect to each other in order to avoid a non-uniform abrasion of the friction linings.

The invention will be described further, by way of example, with reference to the accompanying drawings, in which:

FIG. 9a shows a detail of FIG. 9 along the cut of line A-B;

Figure 1:
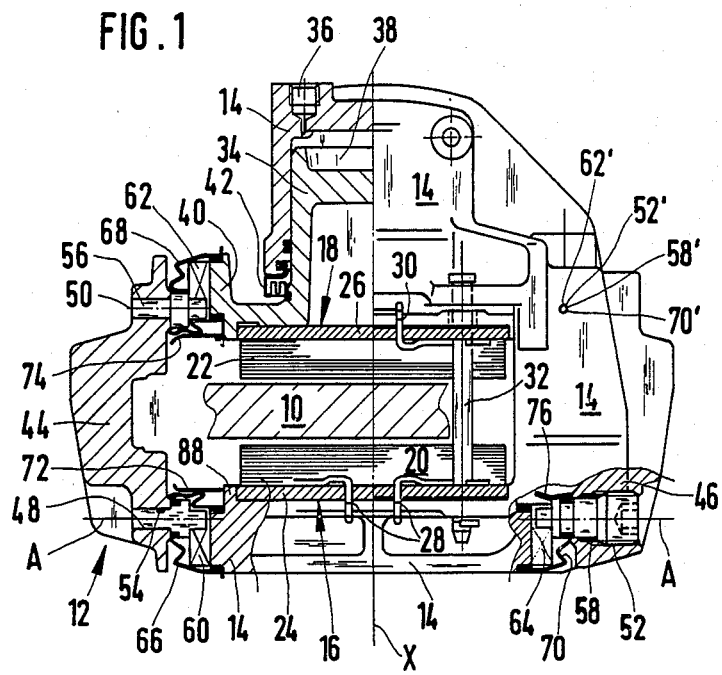
FIG. 1 is a part sectional top plan view of a floating caliper spot-type disc brake.

FIG. 1 shows a brake disc 10, a carrier member 12 fixed at the vehicle, and a floating caliper 14 in horizontal section. Two brake pads 16, 18 are adapted to be applied to either side of the brake disc 10. The brake pads 16, 18 each comprise a friction lining 20 and 22, respectively, and a backplate 24 and 26, respectively. A holding spring 28 for the backplates retains the lower brake pad 16, as seen in FIG. 1, at the floating caliper 14, whereas the top brake pad 18, as seen in FIG. 1, is fixed at piston 34 of a (per se known) piston and cylinder assembly by means of a holding spring 30. Pins 32 (cf. also FIG. 3) extending parallel the axis X of the brake disc 10 likewise serve for fastening of the brake pads 16, 18.

Figure 2:
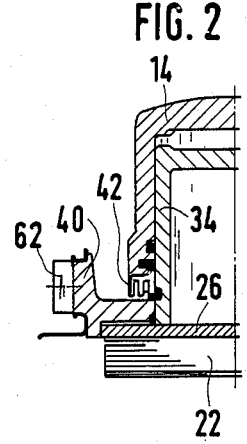
FIG. 2 shows a piston which has been modified as compared to the embodiment according to FIG. 1.

An inlet 36 for hydraulic fluid leads to chamber 38 of the piston and cylinder assembly so that the piston 34 is movable parallel to the axis X in the direction of the brake disc 10. When applying the brake pad 18 which is directly pressurized by the piston 34 against the brake disc 10, also the opposed brake pad 16 is pressed against the brake disc 10 in per se known manner by forces of reaction transmitted through the floating caliper 14. A structural member 40 which may be referred to as a slide is firmly connected to piston 34. In the case of the embodiment shown in FIG. 1 the slide 40 is integral with the piston 34. FIG. 2 shows a modification of this embodiment with which the slide 40 is welded to the piston 34 of conventional design. An elastic sealing bellows 42 seals the sliding surface between the piston 34 and the floating caliper 14.

Figure 3:
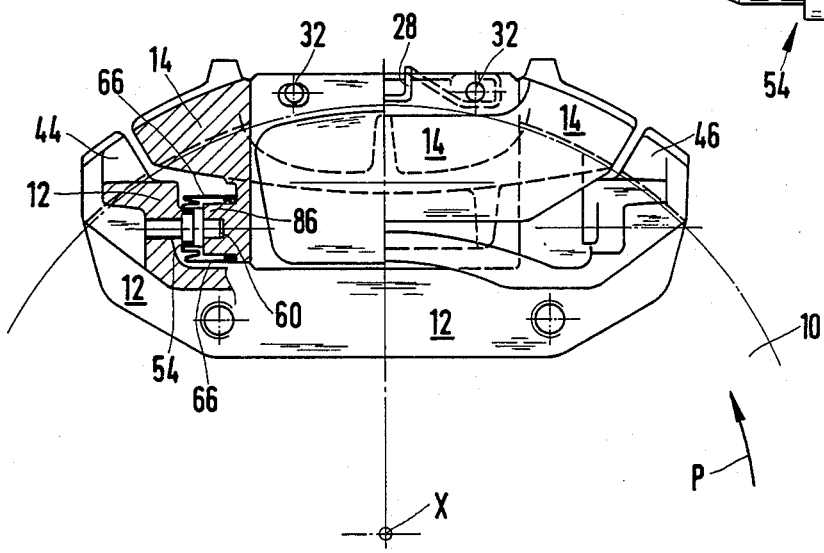
FIG. 3 is a part sectional side elevation of the floating caliper spot-type disc brake shown in FIG. 1.

The carrier member 12 fixed at the vehicle has two carrier arms 44, 46 which project upwardly beyond the brake disc (cf. FIG. 3). Recesses 48, 50, 52, and 52', as shown, are provided in the carrier arms 44, 46 at either side of the brake disc 10. FIG. 1 shows only three recesses 48, 50, and 52 in section, while the fourth recess 52' which corresponds to recess 52 shown is covered by the floating caliper 14.

Guide pins 54, 56, 58, and 58' (guide pin 58' arranged in recess 52' is not shown) are fastened in the recesses 48, 50, 52, and 52', respectively. As may be gathered from FIG. 1, the portions of the guide pins 54, 56, and 58 projecting from the carrier arms 44, 46 extend into grooves 60 (cf. also FIG. 3), 62, and 64 (a groove 62' not shown and corresponding to groove 64 is provided for guide pin 58' likewise not shown). The guide pins 54, 58 associated with the indirectly actuated brake pad 16 (in FIG. 1 below the brake disc 10) extend into guide grooves 60, 64 which are formed in the floating caliper 14. The floating caliper 14 thus is displaceable parallel to the axis X of the brake disc 10.

The guide pins 56 and 58' (the latter corresponding to guide pin 58 and not being shown) associated with the directly actuated brake pad 18 extend into grooves 62, 62' (not shown) which are formed in slide 40 of piston 34. Hereby the piston 34 is movable with respect to the carrier member 12 and its arms 44, 46 in parallel with axis X when hydraulic pressure is generated in the chamber 38.

Elastic boots 66, 68, and 70 (the boot corresponding to guide pin 58' is not shown) cover the sliding guide means composed of guide pins 54, 56, 58, and 58' and the grooves 60, 62, 64, and 62' so that the sliding guide means cannot become dirty and the entry of water is prevented as well which would enhance corrosion.

Figure 4:
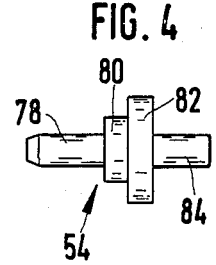
FIG. 4 shows a guide pin on an enlarged scale.

FIG. 3 is a part sectional elevation along line A—A of FIG. 1. Arrow P indicates the direction of rotation of the brake disc 10 during forward travelling of the motor vehicle. The guide pins 58, 58' are much larger at the leading end of the brake than the guide pins 54, 56 at the trailing end of the brake. The bores 48, 50 for the guide pins 54, 56 at the trailing end are of uniform diameter throughout their length. And the portion 78 of the guide pins (FIG. 4) can be pressed into tight fit into the same. A portion 80 of enlarged diameter of the guide pins stops at the carrier arm 44 and likewise serves as seat for the boots 66,68. Another portion 82 of the guide pins at the trailing end of the brake has an increased diameter as compared to portion 80 and clamps the seat of the boots. At the other side the portion 82 of enlarged diameter abuts at either side of the grooves 60 and 62 against the floating caliper 14 and the slide 40, respectively, as may be taken from FIG. 3. A portion 84 of the guide pins at the trailing end of the brake extends into the grooves 60 and 62, respeciively.

Protective sheets 72, 74, and 76 (the protective sheet associated with guide pin 58' is not shown) protect the boots from becoming unduly hot as the brake runs hot. The protective sheets do not enclose the boots all around in order that the space in between may not become clogged by dirt.

At the leading end of the brake (cf. arrow P in FIG. 3) the recesses 52, 52' formed in carrier arm 46 are greater than the recesses 48, 50 which are aligned with the recesses 52, 52' mentioned first along axes extending in parallel with the plane of the brake disc (FIG. 1). The increased diameter at the leading end permits mechanical assembly of the guide pins at the trailing end (the relationship also may be inverted).

The guide pins 54, 56, 58, and 58' are rotationally symmetrical and may be produced at low cost by cold impact press forming. The guide pins 58, 58' disposed at the leading end of the brake are similar to those at the trailing end shown in FIG. 4, but they are threaded and formed with a hexagonal recess at their ends remote from the center of the brake. The guide pins arranged at the leading side of the brake transmit the frictional force generated at the brake disc 10 through the thread to the carrier arm 46 when the vehicle is travelling in backward direction.

Rotating the guide pins 58, 58' arranged at the leading end of the brake (at the right in FIGS. 1 and 3) permits their accurate positioning with respect to the carrier arm 46. In this manner the clearance between the floating caliper 14 and the carrier member 12 which is fixed at the vehicle likewise may be adjusted accurately. The thread with which the guide pins 58, 58' are formed is non-reversible. In a simplified embodiment the adjustable guide pins at the leading end may be replaced by the same guide pins which are being used at the trailing end.

As shown in FIG. 3, the floating caliper 14 is formed with projections 86 opposite the guide pins, the grooves 60, 62, 62', and 64 being formed in these projections and the boots 66, 68, 70 (as well as boot 70' not shown) being carried by these projections. The floating caliper 14 is adapted to pivot about the longitudinal axes A of guide pins 54, 58. The floating caliper 14 is formed with projections 88 at the side of the indirectly actuated brake pad 16, and the backplate 24 of this brake pad is fitted between the same.

In a manner similar to the floating caliper 14, the opposed piston 34 with its slide 40 is pivotable about the longitudinal axes of its associated guide pins 56, 58'. An exact adaptation of the friction linings 20, 22 to the position of the brake disc 10 thus is given under any circumstances.

The floating caliper spot-type disc brakes shown in FIGS. 5 to 8 are of the same basic structure as the embodiment shown in FIGS. 1 to 4, especially as regards the supporting of the brake pads. The same reference numerals are used for members fulfilling the same functions so that reference may be had to the above description. What is different, however, are details of the sliding guide means.

Figure 5:
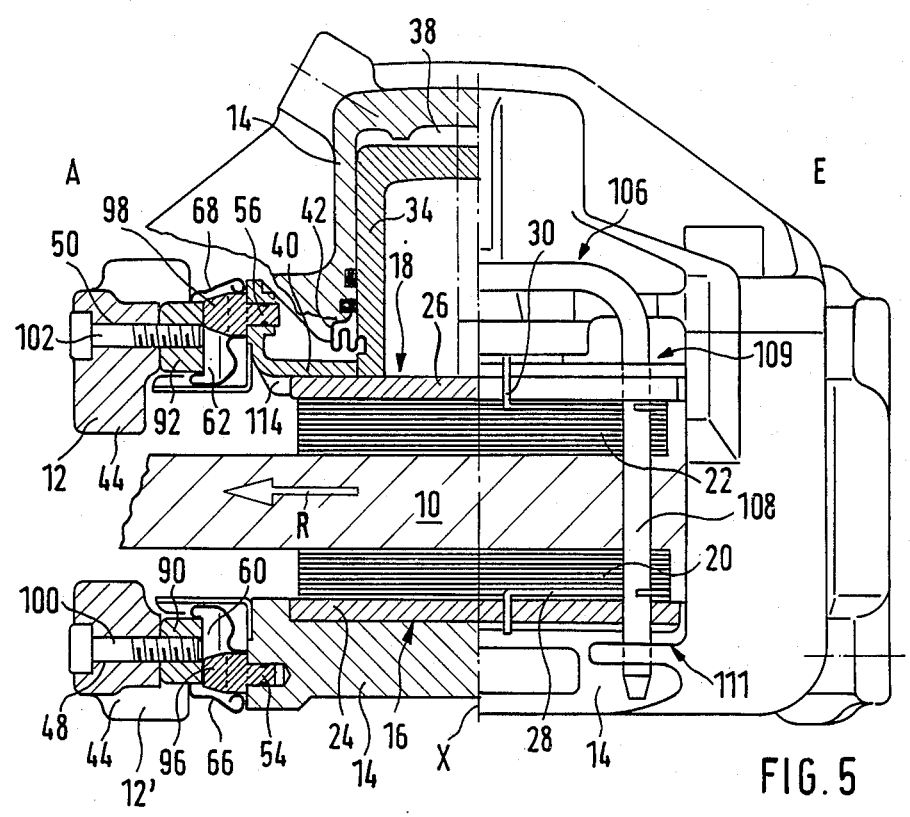
FIG. 5 is a part sectional top plan view of another embodiment of a floating caliper spot-type disc brake.

According to FIGS. 5 to 8 the carrier member 12 which is fixed at the vehicle comprises two carrier arms 44, 46 projecting upwardly above the brake disc 10. The left carrier arm 44 in FIG. 5 is formed with recesses 48, 50 at either side of the brake disc 10. At the leading end E of the brake the opposed carrier arm 46 likewise is formed with two recesses 52 (of which only one is shown). The other recess not shown and corresponding to recess 52 in carrier arm 56 is located at the other side of the brake disc 10 and positioned approximately symmetrically with the recess 52 shown, with respect to the brake disc. In FIG. 5 both recesses 52 are covered by the floating caliper 14.

Two guide pins 54, 56 are provided at the trailing end A of the brake. The lower guide pin 54 in FIG. 5 is fastened directly at the floating caliper 14. The upper guide pin 56 in FIG. 5 is fastened at the slide 40 of piston 34.

Figure 6:
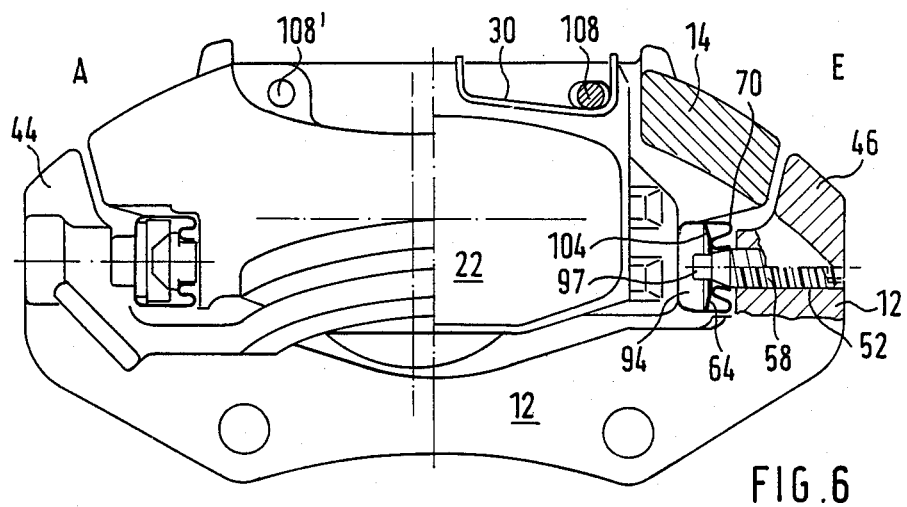
FIG. 6 is a part sectional side elevation of the disc brake shown in FIG. 5.

Two further guide pins 58 (only one of which is shown in FIG. 6) are arranged at the leading end E of the brake. These guide pins are threaded into the recesses 52 described above.

In vertical section (as shown in FIG. 6) the guide pins 54, 56 provided at the trailing end A of the brake are of wedge shape, having a wedge angle of from 90° to 120°. The resulting wedge-shaped tips 96, 98 of the guide pins 54, 56 engage in complementary grooves 60, 62 which are formed in intermediate pieces 90, 92.

At the leading end E of the brake the guidepins 58 have cylindrical tips 97 (only one of which is shown in FIG. 6) for engagement in complementary grooves formed in intermediate pieces 94 (only one of which is shown in FIG. 6) fastened at the floating caliper 14, at the bottom of FIG. 5, and at the slide 40 of piston 34, at the top of FIG. 5.

The four guide pins 54, 56, 58 (the latter being shown only once) thus are displaceable in the grooves 60, 62, 64 (the latter being shown only once) in the direction of the axis X. The wedge-shaped design of the tips 96, 98 of the guide pins 54, 56 at the trailing end A of the brake guarantees that the guide means engage in close fit so that it is warranted that the guided members engage without clearance in all directions.

The intermediate pieces 90, 92 in which the V-shaped grooves 60, 62 of the sliding guide means are formed at the trailing end A of the brake are fastened to the arm 44 of the stationary carrier member 12 by means of fastening screws 100, 102.

At the leading end E of the brake, plate springs 104 (only one of which is shown) are provided, as may be taken from FIG. 6, so as to press the floating caliper 14 or the piston 34 and the slide 40 against the trailing end A of the brake. The plate springs 104 rest on a step formed in the guide pins 58 and press against the intermediate pieces 94 (only one of which is shown in FIG. 6). In this manner the floating caliper 14 is pressed to the left as seen in FIGS. 5 and 6 by the plate spring 104 shown, while the piston 34 and its slide 40 are pressed to the left by means of the plate spring not shown. The sliding guide means are protected from dirt and moisture by elastic boots 66, 68, 70 and another boot not shown but corresponding to boot 70.

A friction lining retaining clamp 106 is of U-shaped design and its two legs 108, 108' straddle the brake disc 10 (FIGS. 5 and 6). As shown in the right half of FIG. 5, leg 108 of the retaining clamp 106 passes through bores at 109 in the slide 40 and in the backplate 26 of the brake pad 18 as well as through bores at 111 in the backplate 24 of the opposed brake pad 16 and the floating caliper 14. As shown in FIGS. 5 and 6, the holding spring 30 located at the inner side of the brake extends below the leg 108 of the U-shaped retaining clamp 106 and is supported on slide 40 by its bent ends. One end of the holding spring 28 disposed at the outer side of the brake is supported on the backplate 24 of the brake pad 16, while the other end rests on the leg 108 of the retaining clamp 106. The same applies to the leg 108' at the left side of the brake (not shown).

The leg 108 of the U-shaped friction lining retaining clamp 106 is bent such that, upon insertion into the bores in the slide 40, in the backplates, and in the floating caliper 14, it will cause the two sliding guide means at the leading end to become twisted so as to bias the inner groove 64 of the sliding guide means at the leading end E, for instance, in downward direction and the outer groove at the leading end in the opposite direction. As a result, support entirely without clearance is established at the leading end as well.

The two guide pins 58 at the leading end E of the brake are adjustable with respect to the stationary carrier member 12 by way of threads. The axial clearance of the floating caliper 14, based on the axis of the guide pin 58, is adjusted to approximately 0.05 to 0.2 mm by rotation of the guide pins 58. As explained above, the plate springs 104 then press the wedge-shaped guide means at the trailing end A of the brake into each other without clearance.

A clearance of approximately 0.02 to 0.1 mm exists in radial direction with respect to the axes of the guide pins 58. This clearance is cancelled in the manner described by the friction lining retaining clamp 106.

Figure 7:
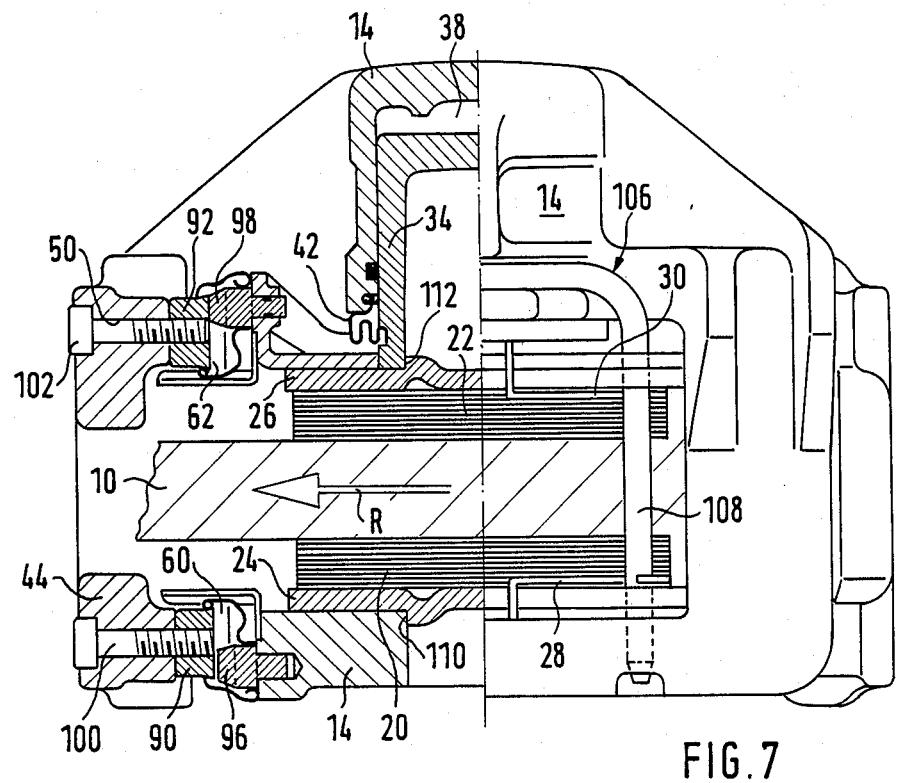
FIG. 7 is a part sectional top plan view of another embodiment of a floating caliper spot-type disc brake.
Figure 8:
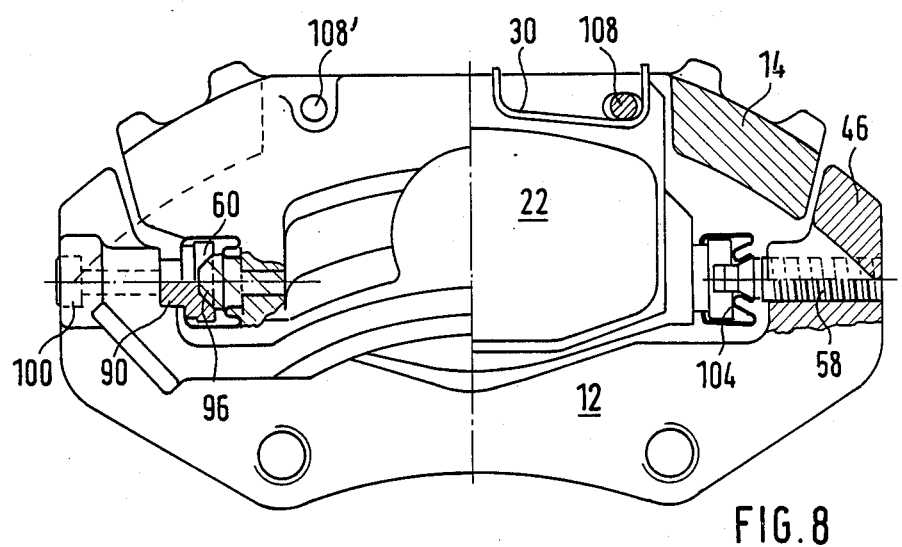
FIG. 8 is a part sectional side elevation of the disc brake shown in FIG. 7.

Another embodiment of a floating caliper spot-type disc brake is shown in FIGS. 7 and 8. It differs from the embodiment according to FIGS. 5 and 6 only by the fastening of the backplates 24, 26 at the floating caliper and at the piston 34, respectively. In the case of the embodiment shown in FIGS. 5 and 6 a recess is provided in the floating caliper 14 to receive the corresponding backplate 24 in tight fit, while the backplate 26 coordinated with the piston 34 at the opposed brake pad 18 is connected to the piston by means of a stop 114.

In the case of the embodiment shown in FIGS. 7 and 8, on the other hand, each backplate 24, 26 has a stop 110 and 112, respectively, formed as a detent by depression and engaging in a recess in the floating caliper 14 or in the piston 34. Otherwise the disc brake according to FIGS. 7 and 8 corresponds to the one shown in FIGS. 5 and 6 and the same reference numerals are used to designate structural members fulfilling identical function.

Figure 9:
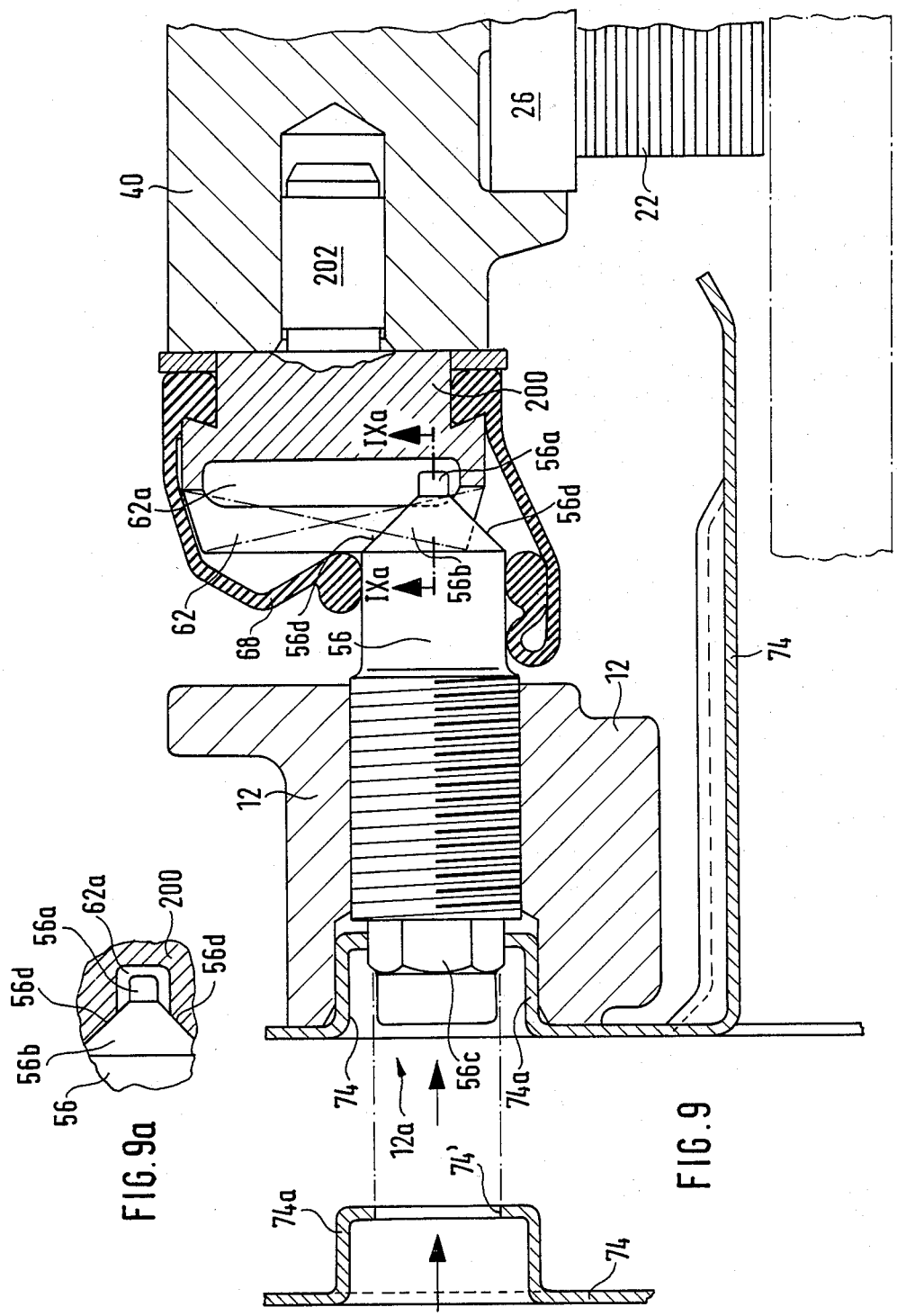
FIG. 9 shows a preferred modification of the guide pins and grooves.

FIG. 9 shows a preferred modification of the guide pins and grooves devised to prevent the floating caliper from slipping out of the carrier member of the brake especially when shipping and storing the floating caliper spot-type disc brake.

The embodiment shown in FIG. 9 among others differs from the embodiments described above in that a separate sliding piece 200 is fastened by a closely fitting pin 202 in the slide 40 (or in the floating caliper 14—not shown in FIG. 9). The groove 62 is provided in the sliding piece 200 which is made of hardened material. At its bottom, the groove 62 is formed with another narrower groove 62a which is limited in axial direction (FIG. 9) By its portion 56b the guiding pin 56 engages in the groove 62. This portion 56b engaging in the groove 62 includes an additional small tongue 56a (cf.

also FIG. 9a) which in turn engages in the additional narrower groove 62a. This tongue 56a does not establish any direct support between the slide 40 (or the floating caliper 14). Instead it serves no other purpose but to prevent the guide pin 56 from slipping axially out of the groove 62 during storage or shipment.

As compared to the embodiments shown in FIGS. 1 to 8, FIG. 9 illustrates a variant as regards the protective sheet 74. As may be taken from the drawing, carrier member 12 is formed with a recess 12a in which guide pin 56 is countersunk. When the brake is assembled, a hexagonal portion 56c of guide pin 56 is fully received in this recess 12a. As shown in FIG. 9, the protective sheet 74 is formed with a bulge 74a engaging in the recess 12a in carrier member 12 and having an opening 74' which is pressed on the hexagonal portion 56c of guide pin 56.

FIG. 9a shows those portions of guide pin 56 which engage in the groove 62 and the additional narrower groove 62a. As may be taken from FIG. 9a, the tongue 56a provided at guide pin 56 does not contact a surface of the narrower groove 62a. The support between the guide pin 56 and the sliding piece 200 (cf. also FIG. 9) is established exclusively by the flanks 56d of portion 56b of guide pin 56. It is only these flanks 56d of the guide pin which abut against the walls of groove 62 (cf. the embodiments described with reference to FIGS. 1 to 8). In a special embodiment of the guide pins 56 the flanks 56d are barrel shaped, i.e. instead of being rectilinear, the flanks 56d are curved. The great radius of the barrel defining the flanks 56d is in the order of 150 mm. In this manner the guide pin 56 is not in rectilinear engagement with the walls of the groove 62 but instead in point contact. Barrel-shaped supports as such are known. With floating caliper spot-type disc brakes such barrel-shaped designs of the flanks 56d of the guide pin 56 have the advantage of providing good support if the slide 40 or floating caliper 14 suffer deformations.

With the embodiments described so far allowance was not made as yet for the fact that torques at the backplates 24, 26 of the friction linings occur during braking (i.e. when the friction linings 20, 22 are pressed against the brake disc 10). These torques may cause the backplates to tilt with respect to the axis X of the brake. Such tilting results in uneven (oblique) wear of the friction linings as described in DE-PS No. 12 38 284.

Figure 10:
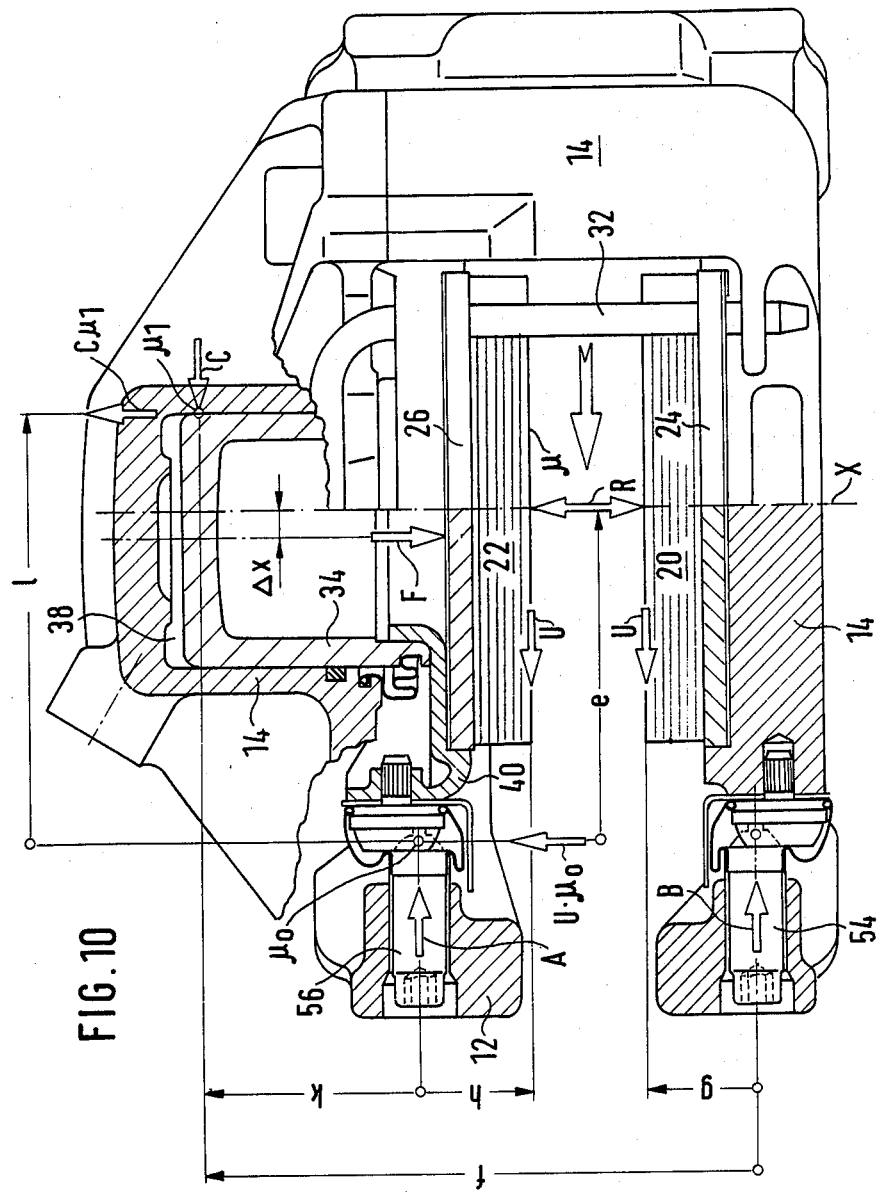
FIG. 10 shows the axial offset of the backplates of the friction linings at the piston end.

The support of the backplates in accordance with the invention at the floating caliper alone or at the piston alone of the piston and cylinder assembly as well as the teaching to provide another sliding guide means 56, 62, 58', 62' between the piston 34 or the slide 40 firmly connected to the same and the carrier member 12 has the advantage that the lever arms "h" and "g", as shown in FIG. 10, between the friction surfaces of tne friction linings 20, 22 and the corresponding supports at guide pins 54, 56 (the same applies to the other supports at the opposite side) are independent of the present state of wear of the friction linings 20, 22. In other words, lever arms "h" and "g" remain constant throughout the wear of the friction linings. For this reason the so-called piston offset may be provided. This means that the axis of piston 34 may be offset with respect to the axis X of the brake. This offset is marked Δx in FIG. 10. The piston offset Δx may be calculated as explaned below, all essential magnitudes being entered in FIG. 10.

The circumferential frictional force U results from U=Rxμ. F is assumed to be the piston pressure. The reaction force R corresponding to piston pressure F is marked in FIG. 10 and acts on the center of the friction lining so that the wear will be symmetrical. A designates the supporting force at the inner side of the carrier member, while B indicates the supporting force at the outer side of the carrier member. C is the supporting force acting at piston 34. The outer circumferential force due to friction of the brake produces a torque at the housing having lever radius "g" and being stopped at piston 34. Force C 15 may be defined as follows:

$$C = \frac{U \cdot g}{f} \qquad (0)$$

If $\mu$ represents the coefficient of friction of the lining, $\mu_o$ represenss the coefficient of friction between the lubricated and sealed support (between guide pin and groove), and $\mu_1$ the coefficient of friction of piston 34 in chamber 38, the following is applicable:

$$U = R \cdot \mu \qquad (1)$$

$$R = F - U \cdot \mu_o \qquad (2)$$

If equation (1) is inserted in equation (2), the result is as follows:

$$R = \frac{F}{1 + \mu \cdot \mu_o} \qquad (3)$$

If equations (1) and (3) are entered in the above equation (0), the result is as follows:

$$C = \frac{F \cdot \mu}{1 + \mu \cdot \mu_o} \cdot \frac{g}{f} \qquad (5)$$

If equation (3) is inserted in equation (1), the result is as follows:

$$U = \frac{F \cdot \mu}{1 + \mu \cdot \mu_o} \qquad (6)$$

If canting is to be prevented, all torques about support point "A" must be balanced, i.e. the sum of all torques must be zero, in other words:

$$\Sigma M_A = 0$$

$$\Sigma M_A = U \cdot h + F(e - x) - R \cdot e - C \cdot k - C \cdot \mu_1 \cdot 1 = 0$$

$$= \frac{F \cdot \mu}{1 + \mu \cdot \mu_o} \cdot h + F \cdot e - F \cdot x - \frac{F}{1 + \mu \cdot \mu_o} \cdot e -$$

$$\frac{F \cdot \mu}{1 + \mu \cdot \mu_o} \cdot \frac{g \cdot k}{f} - \frac{F \cdot \mu}{1 + \mu \cdot \mu_o} \cdot \frac{g \cdot \mu_1 \cdot 1}{f} = 0$$

(F not applicable)

$$= -x + e + \frac{1}{1 + \mu \cdot \mu_o} \left[ \mu \cdot h - e - \frac{g}{f} (\mu \cdot k + \mu \cdot \mu_1 \cdot 1) \right] = 0$$

$$\Delta x = e + \frac{1}{1 + \mu \cdot \mu_o} \left[ \mu \cdot h - e - \frac{g}{f} (\mu \cdot k + \mu \cdot \mu_1 \cdot 1) \right]$$

$$\Delta x = e + \frac{1}{1 + \mu \cdot \mu_o} \left[ h + \frac{e}{\mu} - \frac{g}{f} (k + \mu_1 \cdot 1) \right]$$

By modifying the embodiment shown in FIG. 1, a variant of the invention is characterized in that the friction lining backplate 26 at the piston end is subjected to pressure, in other words forced in axial direction only. The supporting in circumferential direction of the backplate 26 is devised such that the backplate 26 is guided directly at the carrier member 12 by a guide means. This means that the other guide means is not provided between the piston 34 or a structural member 40 firmly connected to the same and the carrier member 12 but instead directly between the backplate 26 and the carrier member 12.

What is claimed is:

1. A floating caliper spot-type disc brake for motor vehicles, comprising
    a floating caliper (14) supported for displacement with respect to a carrier member (12) which is fixed at the vehicle,
    two brake pads (16,18) for pressurizing a brake disc (10) from either side,
    an hydraulic piston and cylinder assembly (34) in the floating caliper (14) on one side of said disc (10) for direct pressurization of one (18) of said two brake pads (16,18) of said one side of said disc and indirect pressurization of the other (16) of said two brake pads (16,18) on the other side of said disc (10) by way of the floating caliper (14), and
    a sliding guide means (54,60;58,64) between the carrier member (12) and the floating caliper (14) on said other side of said disc (10),
characterized in that said other brake pad (16) is supported circumferentially exclusively on the floating caliper (14) and said one pad (18) is supported circumferentially exclusively on the piston (34) of the piston and cylinder assembly, and in that another sliding guide means (56,62; 58', 62') on said carrier member (12) on said one side of said disc (10) is directly engaged by said piston (34).

2. The floating caliper spot-type disc brake as claimed in claim 1, characterized in that the sliding guide means (54,60;58,64) between the carrier member (12) and the floating caliper (14) has two projections (54,58) formed on one of these two members and two recesses (60,64) in the other one in which the projections (54,58) are displaceable perpendicularly with respect to the plane of the brake disc (10), and in that the sliding guide means (56,65) directly engaged by said piston (34) has two projections (56,58') formed on one of these two members and two recesses (62,62') in the other one in which the projections are displaceable perpendicularly with respect to the plane of the brake disc (10).

3. The floating caliper spot-type disc brake as claimed in claim 2, characterized in that each projection is embodied by a guide pin (54,56,58 58') fastened to the carrier member (12) and engaging respectively in groove-like recesses (60,64) in the floating caliper (14) and in groove-like recesses (62,62') in the piston (34).

4. The floating caliper spot-type disc brake as claimed in claim 1, characterized in that the sliding guide means are enclosed by elastic boots (66,68,70,70').

5. The floating caliper spot-type disc brake as claimed in claim 4, characterized in that the elastic boots (66,68, 70,70') are covered by a protective sheet (72,74,76,76') at least at their side facing the brake pads (20,22).

6. The floating caliper spot-type disc brake as claimed in claim 5, characterized in that rotationally symmetrical seats for protective boots (66,68,70 and 70') are provided at the floating caliper (14) and piston (34), respectively.

7. The floating caliper spot-type disc brake as claimed in claim 1, having a trailing end (A) and a leading end (E) characterized in that the sliding guide means at the trailing end (A) of the brake each are formed by tongue and groove arrangements (60,96;62,98).

8. The floating caliper spot-type disc brake as claimed in claim 7, characterized in that the tongues of said tongue and groove arrangements comprise wedge-shaped guide pins (54,56) fastened respectively to the floating caliper (19) and to the piston (34) at the trailing end (A) of the brake, each of said guide pins (54,56) engaging in a complementary groove (60 or 62) formed in the carrier member (12).

9. The floating caliper spot-type disc brake as claimed in claim 7, characterized in that the sliding guide means (58',62';58,64) between the piston (34) and the floating caliper (14), respectively, and the carrier member (12) at the leading end (E) of the brake are formed by respective cylindrical guide pins (58,58') which are fastened to the carrier member (12) and engage in complementary grooves (62',64) in the piston and in the floating caliper (14) respectively.

10. The floating caliper disc brake as claimed in claim 9, characterized in that at least two springs (104) are provided which are supported at one end by the carrier member (12), one of which springs acts at its other end on the floating caliper (14) whereas the other spring acts at its other end on the piston (34) at the leading end (E) of the brake to bias the floating caliper and the piston respectively in the direction of the trailing end (A) of the brake.

11. The floating caliper spot-type disc brake as claimed in claim 2, characterized in that at least part of the recesses (60,62,62',64) are groove-like and each is formed in its bottom with another narrower groove (60a,62a,62'a,64a) of limited axial extent and into which is received a tongue (54a,56a,58a,58'a) of the respective guide pins (54,56,58,58').

12. The floating caliper spot-type disc brake as claimed in claim 2, characterized in that the portion (54b,56b,58b,58'b) of the guide pins (54,56,58,58') engaging in the groove-like recesses (60,62,62',64) includes flanks (56d) of barrel-surface shape.

13. The floating caliper spot-type disc brake as claimed in claim 1, characterized in that each brake pad (16,18) includes a respective backplate (24,26) which circumferentially support said pads (16,18) on said caliper (14) and said piston (34), respectively, said backplate (26) supported on the piston (34) being offset in a circumferential direction with respect to an axis X of the brake by a distance Δx which is defined as follows:

$$\Delta x = e + \frac{1}{1 + \mu \cdot \mu_o} \left[ h + \frac{e}{\mu} - \frac{g}{f} (k + \mu_1 \cdot 1) \right]$$

wherein
   e = the distance between axis X and the point of support of the backplates;
   $\mu$ = the coefficient of friction of the lining;
   $\mu_o$ = the coefficient of friction of the support;
   $\mu_1$ = the coefficient of friction of the piston (34);

h = the distance between the friction surface of the friction lining (22) at the piston end and the point of support of the corresponding backplate (26);

g = the distance between the friction surface of the friction lining (20) at the floating caliper end and the corresponding support of the backplate (24);

k = the distance between the support point A at the piston end and the supporting force C of the friction lining at the floating caliper end as transmitted by the housing; and f = the distance between C and the support point B at the floating caliper end.

14. The floating caliper spot-type disc brake as claimed in claim 1, including a U-shaped retaining clamp (106) for the friction linings, characterized in that the legs (108,108") of said retaining clamp (106) are curved such that at the leading end (E) of the brake the grooves (64) of the sliding guide means (64,58) are biased in opposite directions to minimize rattle.

15. The floating caliper spot-type disc brake as claimed in claim 9, wherein said complementary grooves in the caliper are in an intermediate piece firmly connected to the caliper.

* * * * *